(12) United States Patent  (10) Patent No.: US 6,749,210 B2
Tanaka  (45) Date of Patent: Jun. 15, 2004

(54) HUB FOR WHEEL AND WHEEL BEING EQUIPPED WITH SAID HUB

(75) Inventor: Kouji Tanaka, Osaka (JP)

(73) Assignee: Araya Industrial Co., Ltd., Osaka (JP)

( * ) Notice: Subject to any disclaimer, the term of this patent is extended or adjusted under 35 U.S.C. 154(b) by 76 days.

(21) Appl. No.: 10/032,491

(22) Filed: Jan. 2, 2002

(65) Prior Publication Data

US 2002/0175485 A1 Nov. 28, 2002

(30) Foreign Application Priority Data

May 23, 2001 (JP) ....................................... 2001-153364
Sep. 17, 2001 (JP) ....................................... 2001-281578

(51) Int. Cl.⁷ ............................................. B60G 9/02
(52) U.S. Cl. ............................................. 280/124.125
(58) Field of Search ................... 280/124.125, 124.126, 280/124.127, 250.1, 304.1, 11.225, 11.28, 87.01; 301/110.5; 152/93, 87

(56) References Cited

U.S. PATENT DOCUMENTS 5,362,081 A * 11/1994 Beidler et al. .......... 280/250.1
5,727,850 A * 3/1998 Masclet .................. 301/111.03
5,941,547 A * 8/1999 Drake .......................... 280/243
6,237,724 B1 * 5/2001 Niedrig ....................... 188/2 F

FOREIGN PATENT DOCUMENTS

JP 365262 1/1949
JP 6-32108 4/1994
JP 8-173482 7/1996

* cited by examiner

*Primary Examiner*—Paul N. Dickson
*Assistant Examiner*—Faye M. Fleming
(74) *Attorney, Agent, or Firm*—Westerman, Hattori, Daniels & Adrian, LLP

(57) ABSTRACT

A hub for a wheel wherein a buffer mechanism is inside the hub barrel to reduce shock caused by a difference in level and thus enhance comfort and durability, and the left and right lateral torsion in the direction of an axle of a wheel is eliminated to improve safety, this hub for a wheel (10) includes a mechanism wherein the hub barrel (11) has an axle (21) therein, a rotator (26) for rotating and supporting the axle (21) is made to buffer (40) independently of rotation of the axle (21), the buffer (40) rotatably engages the rotator (26) of the hub barrel (11) by a link mechanism (30), and has a frame shaft (20) for engaging and supporting the vehicle frame (19).

7 Claims, 14 Drawing Sheets

HUB FOR WHEEL AND WHEEL BEING EQUIPPED WITH SAID HUB

DETAILED DESCRIPTION OF THE INVENTION

1. Technical Field to Which Invention Belongs

The present invention relates to a hub for a wheel mounted on a wheelchair, a bicycle or the like provided with buffer means, and particularly to a hub for a wheel with buffer function in which when the vertical shock received from the road surface is received, the shock is not transmitted to the vehicle body directly but the shock is absorbed to enable running smoothly, and a wheel equipped with the hub for a wheel.

1. Related Art

At present, most of roads in our country are paved by asphalt or the like. Accordingly, no large unevenness is present on the road, and vehicles such as a wheelchair or a bicycle can be passed smoothly. Further, in order to secure the safety of passage of walkers, and vehicles such as a wheelchair, a bicycle and so on, there is provided, on the side of the automobile road, a sidewalk on which vehicles such as a wheelchair, a bicycle and so on may run. Therefore, the chance of going out by vehicles such as a wheelchair, a bicycle and so on increases. Further, it is expected that in the twenty-first century, in Japan, the society of a person of advanced age in which persons of advanced age over 65 years old occupy one person per three persons of population will come. As the life of a person extends, people disabled due to the advanced age increases rapidly. It is therefore supposed that persons of advanced age making use of a wheelchair when they go out be increased.

Further, the arrangement or adjustment of not only the outdoor roads but the living environment without difference in level are now being carried out. However, there are still present many differences in level in many road surfaces or residential facilities, and in addition, are present various differences in level in partial places such as differences in level of uneven parts appearing on the pavement of roads due to the road work or gas work, tracks caused by running of large-type vehicles and differences in level in cross-walks resulting therefrom, difference in level appearing in a boundary between a roadway and a side walk, differences in level caused by the change in passage of year of the road; and differences in level caused by a textured paving block for visual disabled persons provided on a side walk. People making use of a wheelchair such as persons of advanced age are suffered from inconvenience due to many differences in level present. For this reason, recently, there advocates the smoothness, that is, barrier-free. However, there is a problem that the vehicles such as a wheelchair or a bicycle rather have to pass carefully.

For overcoming this problem, it is necessary to further progress an improvement toward the barrier-free in the road surface or within the residence, but it requires considerable time and expenses in the improvement toward the barrier-free. In view of this, if a part of the construction of a wheelchair or the like being used now can be changed into the construction provided with a buffer mechanism, this is the best means which saves time and cost.

Incidentally, the present wheel of a vehicle such as a wheelchair or a bicycle has the construction in which spokes are stretched radially from the hub fitted in the axle and connected to the rim to apply tension to the spokes, thereby holding the rigidity of the whole wheel. Such a wheel as described above has the construction in which elasticity does not exert in a longitudinal direction vertical to the road surface. Therefore, when the vehicle such as a bicycle or a wheelchair having the wheel of construction as described passes the road or the side walk, it runs on various difference in level described above to pass. Since the shock from bottom when passing the difference in level is transmitted to a rider directly through the frame from the axle of the hub, the rider is not comfortable to ride, also influencing the durability of the vehicle body. In case the wheel mainly comprising a castor mounted as a front wheel of a wheelchair tries to ride over the difference in level, the wheel need be raised by the amount of height of the wheel, for which the rider has to use the great force. Therefore, the rider tries to move his (her) weight by force to gain momentum or makes use of reaction to ride over the difference in level. However, the shock received when riding over the difference in level is extremely great, which is not comfortable to ride for the rider.

For overcoming the disadvantages as noted above, in case of a bicycle, a spring is put into saddle or a buffer member such as a coil spring is provided on the frame itself. Further, measures are taken to lower air pressure within the tire. However, in the measures for lowering air pressure of the tire, the resistance between the wheel and the road surface is increased by lowering air pressure, further posing an inconvenience that when traveling, a burden is imposed on a rider. For overcoming these inconveniences, a proposal has been heretofore made of a wheel to which buffer means is added. For example, there is disclosed a wheel having the constitution described in Japanese Registered Utility Model Publication No. 365262.

The wheel of the prior art described above has a buffer device in which a bearing comprising a ball bearing or a roller bearing is provided in the center of a hub casing (i.e., a hub barrel), a spring receiver is provided radially on the outer circumference of the bearing, a spring receiver is provided on the inner circumference of the hub casing, and an eddy-like spring is provided between both the spring receivers described above.

The above-described prior art surely exhibits the effect relative to the vertical shock of the wheel when ridden on the difference in level, but the rigidity in a lateral direction (left and right) which is the direction of an axle due to many eddy-like springs provided radially, possibly twisting the wheel. As a result, this fails to have the function as a wheel, resulting in a decisive inconvenience of impairing the safety. This cause results from the construction in which the hub barrel forming a hub is that rotational means comprising a bearing and buffer means comprising eddy-like springs are connected together, and the eddy-like springs rotates together with the rotation of the wheel.

Further, in case of a wheelchair, as a mechanism for relieving the shock received from the difference in level, there is a buffer mechanism making use of the existing frame construction for supporting the wheel. This buffer mechanism has the construction in which for supporting a castor, a compression spring is encased in a longitudinal pipe as a frame associated and fitted in the upper part of a support shaft to receive the support shaft of the castor, whereby running over the difference in level, the support shaft of the castor is moved upward springly against the spring, and after running over the difference in level, the support shaft is moved downward again to assume the original state to enable restoring. The construction in which the support frame of the castor is provided with the buffer mechanism to absorb the shock is disclosed in the Specification of Japanese Patent Application No. Hei 8 (1996)-173482. Incidentally, the wheelchair with buffer mechanism is excellent as one to be manufactured newly. However, when the above construction is intended to be provided on the normal existing wheelchair without the buffer mechanism, large-scaled work involves, since in the normal existing wheelchair, the longitudinal pipe as a frame for supporting the castor is deposited assembled by welding as a part of the frame construction of the wheelchair body, in changing the longitudinal pipe into the longitudinal pipe provided with the above-described buffer device, thus posing a problem that time and cost are required to render unpractical.

On the other hand, there is disclosed, in Japanese Utility Model Application Laid-Open No. Hei 6 (1994)-32108, a wheelchair provided with a castor of the construction of a buffer mechanism in which one end of a downwardly biasing return spring is mounted on a wheel hub constituting a castor, the other end of the return spring is mounted on a fork supporting the castor, the return spring is interposed between the wheel hub and the fork, and the castor is moved up and down with respect to the fork by the return spring to absorb the shock. However, in case where the castor provided with the buffer mechanism is changed into the castor of the conventional wheelchair, it is necessary, since the fork for supporting the castor of the wheelchair is not the construction for mounting a return spring, to change the above-disclosed spring into a mountable fork. This work involves a problem that cannot be embodied easily.

PROBLEM TO BE SOLVED BY THE INVENTION

The present invention provides a hub for a wheel having a buffer mechanism internally of a hub barrel, having an internal construction in which the great shock caused by a difference in level is relieved to enhance the comfort to ride and the durability, and the left and right lateral torsion in the direction of an axle of a wheel is eliminated to improve the safety, and further provides easily a conventional wheelchair or a bicycle as a vehicle having a buffer mechanism, by merely replacing only the wheel equipped with a hub for a wheel of high safety without changing other members.

MEANS FOR SOLVING THE PROBLEM

As means of the present invention for solving the above-described problems, the invention of claim 1 provides a hub for a wheel 10 comprising a hub barrel 11, rotational means 26, buffer means 40 and a frame shaft 20 for supporting a vehicle frame 19 disposed internally of the hub barrel 11.

The invention of claim 2 provides the hub for a wheel 10 according to claim 1, wherein the hub barrel 11 has an axle 21 internally thereof, and rotational means 26 for rotatably supporting the axle 21, and buffer means 40 independently of rotation of the axle 21 are disposed within the hub barrel 11.

The invention of claim 3 provides the hub for a wheel 10 according to claim 2, wherein the buffer means 40 has the frame shaft 20 for rotatably engaging the rotational means 26 of the hub barrel 11 by a link mechanism 30 (50), and engaging and supporting a vehicle frame 19.

The invention of claim 4 provides the hub for a wheel 10 according to claim 2, wherein the rotational means 26 comprises bearings 24, 24 fitted in left and right of an axle holding member 41 (51) and the axle 21 fitted in the bearings 24, 24.

The invention of claim 5 provides the hub for a wheel 10 according to claim 1, wherein the hub barrel 11 has the rotational means 26 internally thereof, the buffer means 40 is fitted internally of the rotational means 26, and the frame shaft 20 for engaging and supporting the vehicle frame 19 is disposed on the buffer means 40.

The invention of claim 6 provides the hub for a wheel 10 according to claim 4 or 5, wherein the rotational means 26 comprises the bearings 24, the buffer means 40 comprises a link mechanism 130 engaged with the rotational means 26 independently of rotation of the rotational means 26, and the frame shaft 20 for engaging and supporting the vehicle frame 19 is an axle 121 provided on the link mechanism 130.

The invention of claim 7 provides a wheel 17 equipped with the hub for a wheel 10 according to any of claims 1 to 6.

OPERATION OF THE MEANS OF THE PRESENT INVENTION

The hub for a wheel 10 is provided, within the hub barrel 11, with the rotational means 26 of the hub barrel 11 and the buffer means 40, spokes 14, a rim 15 and a tire 16 are sequentially incorporated into the hub for a wheel 10 to assemble a wheel 17, to thereby easily obtain the wheel 17 having the buffer means 40. Further, a disk 114 can be used in place of the spoke 14 to constitutes the wheel 17, in which case the wheel 17 may be a wheel of a castor 117. Accordingly, in a vehicle 27 having no buffer means in a vehicle frame 19 or a wheel, the wheel 17 comprising a normal hub for a wheel without buffer means of the vehicle 27 is replaced by the wheel 17 equipped with the hub for a wheel 10 of the present invention to thereby enabling the provision of the vehicle 27 having the buffer means 40 very easily. A castor of a front wheel or a wheel of a rear wheel of a wheelchair having no normal buffer means is merely replaced by a castor 117 which is the wheel 17 having the buffer means 40 of the present invention or the wheel 17 of the rear wheel to provide a wheelchair 18 having the buffer means.

Particularly, since the hub for a wheel 10 according to claim 5 or 6 can be miniaturized, there can be provided a castor 117 having the buffer means 40 of the same size as the conventional castor. Accordingly, by merely exchanging with a castor shaft 119, it is possible to replace the conventional caster by the castor 117 having the buffer means 40 within the hub barrel 11. As a result, there can be provided a vehicle 27 such as a wheelchair 18 or a bicycle which can be run lightly without imposing a burden caused by rapid vibrations on a rider in the road having a difference in level.

Particularly, in the buffer means 40, since in claims 1–4, rotational means 26 of the hub barrel 11 is engaged by a cantilever link mechanism 30 or a parallel link mechanism 50, or since claim 5 or 6 comprises a link mechanism 130 engaged within rotational means 26, the torsion in the direction of the axle is prevented. Further, the buffer means 40 and the rotational means 26 are engaged by the cantilever link mechanism 30 or the parallel link mechanism 50, or by the link mechanism 130 engaged in the rotational means 26, and both of them comprise means independently of each other, that is, the buffer means 40 comprises means which is not rotated along with rotation of the hub barrel 11 but buffer-supports the axle 21 (121) movably only in the vertical direction, thus not impairing the rotation of the hub barrel 11. Accordingly, since the buffer means 40 is not rotated and can absorb only the vibration of the axle 21 in the vertical direction, there occurs no left and right lateral swaying in the axle direction of the wheel 17 or the castor 117. Accordingly, since the buffer means 40 is able to support the rotational means 26 of the hub barrel 11 in the stabilized manner, the buffer means 40 always absorbs only the rapid vibrations in the vertical direction vertical to the axle 21 (121) to suppress the vibrations, thus enabling obtaining the wheel 17 having the good comfort to ride, or the castor 117 and the wheel 17, or the vehicle 27 equipped with the castor 117 or the wheelchair 18.

As described above, the present invention exhibits the excellent effects that have not been found in prior art, that is, in the hub for a wheel according to the present invention, the buffer means is placed within the hub barrel to provide arrangements: the buffer means and the rotational means are operated independently whereby the buffer means is not rotated as the wheel rotates, and the rigidity of the wheel in the direction of the axle is enhanced; the buffer means and the rotational means are made to be independent whereby even if a trouble or a defect occurs, replacement of the respective means can be facilitated; the buffer means is provided within the hub for a wheel whereby even if the wheel runs on the difference in level directly, the shock received from the difference in level can be relieved to be comfortable to ride; the buffer means is provided within the hub for a wheel whereby the freedom of designing the vehicle is enhanced; and in the conventional vehicle without buffer means, the wheel of the vehicle is merely replaced by the wheel using the hub for a wheel according to the present invention to enable providing the vehicle having the buffer means easily.

Figure 1:
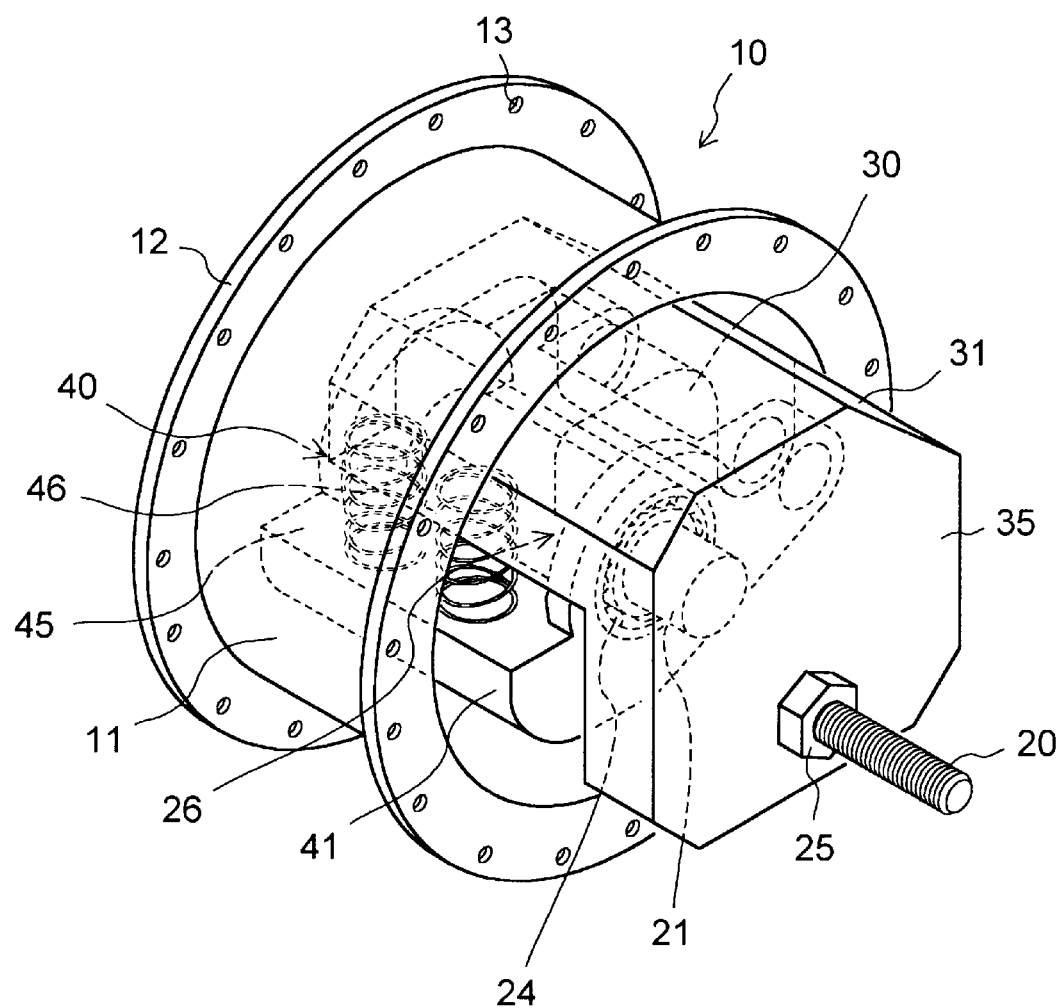
FIG. 1 is a perspective view of a hub for a wheel according to a first embodiment of the present invention.

In these drawings, reference numeral 10 designates a hub for a wheel; 11 a hub barrel; 12 a hub flange; 13 a spoke hole; 14 a spoke; 15 a rim; 16 a tire; 17 a wheel; 18 a wheelchair; 19 a vehicle frame; 20 a frame shaft; 21 an axle; 22 an axle base member; 23 a screw; 24 a bearing; 25 a bolt; 26 a rotational means; 27 a vehicle; 28 an axle position; 29 a frame shaft position; 30 a link mechanism; 31 a frame shaft holding member; 32 a downward engaging convex; 33 a link shaft inserting hole; 34 a buffer member receiver; 35 a frame shaft mounting plate; 40 a buffer means; 41 an axle holding member; 42 an engaging protrusion; 43 a link shaft inserting hole; 44 a link shaft; 45 a buffer member receiver; 46 a buffer member; 50 a link mechanism; 51 an axle holding member; 52 a link member sector engaging plate; 53 un upper link member engaging hole; 54 a lower link member engaging hole; 55 an axle-side buffer member receiver; 56 a link shaft; 61 a frame shaft holding member; 62 a frame shaft mounting element; 63 an upper link member engaging element; 64 an upper link member engaging hole; 65 a lower link member engaging element; 66 a lower link member engaging hole; 71 an upper link member; 72 a downward engaging convex; 73 an engaging hole; 74 an upper buffer member receiver; 81 a lower link member; 82 an upward engaging convex; 83 an engaging hole; 84 a pivotal shaft; 85 a buffer member; 114 a disk; 117 a castor; 118 a castor frame; 119 a castor shaft; 121 an axle; 122 a washer; 123 a bolt; 124 a bearing; 125 a bearing outer ring; 126 a bearing inner ring; 130 a link mechanism; 131 an external link; 132 a bearing inner ring fitting circumferential surface; 133 an internal link oscillating space; 134 a link shaft hole; 135 a buffer member receiving hole; 136 an internal link; 137 a link retaining frame; 138 a link shaft hole; 139 a link shaft; 140 an axle hole; 141 a buffer member receiving hole; 142 an internal link receiving seat; 143 a bearing outer ring fitting circumferential surface; 146 a buffer member; 150 an internal link tilting angle; 151 a smooth road surface; 152 a difference in level; 153 a difference-in-level height; 154 a wheel; 155 a bolt; and 156 an axle height.

EMBODIMENTS OF THE INVENTION

The embodiments of the present invention will be described hereinafter with reference to the drawings.

First, a first embodiment of a hub for a wheel 10 of the present invention shown in FIGS. 1~3 will be described. The hub for a wheel 10 comprises a hub barrel 11 encasing therein a rotational means 26 and a buffer means 40 of an axle 21 disposed in the internal center portion, and making one part a closed portion and the other an open portion, and hub flanges 12 provided radially on opposite ends and having a plurality of spoke holes 13 disposed evenly in the peripheral direction.

Figure 2:
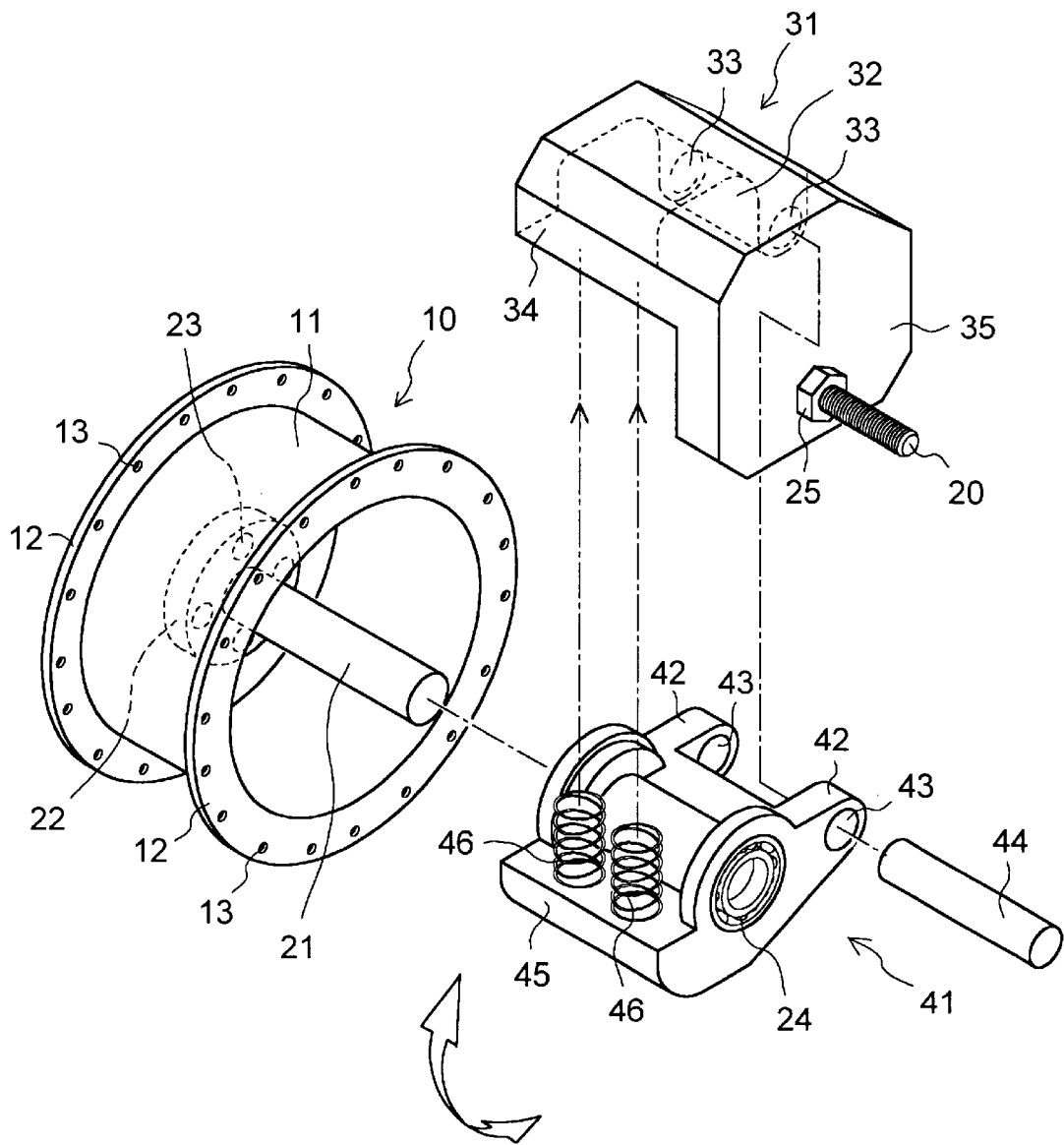
FIG. 2 is an exploded view of the hub for a wheel in FIG. 1.
Figure 3:
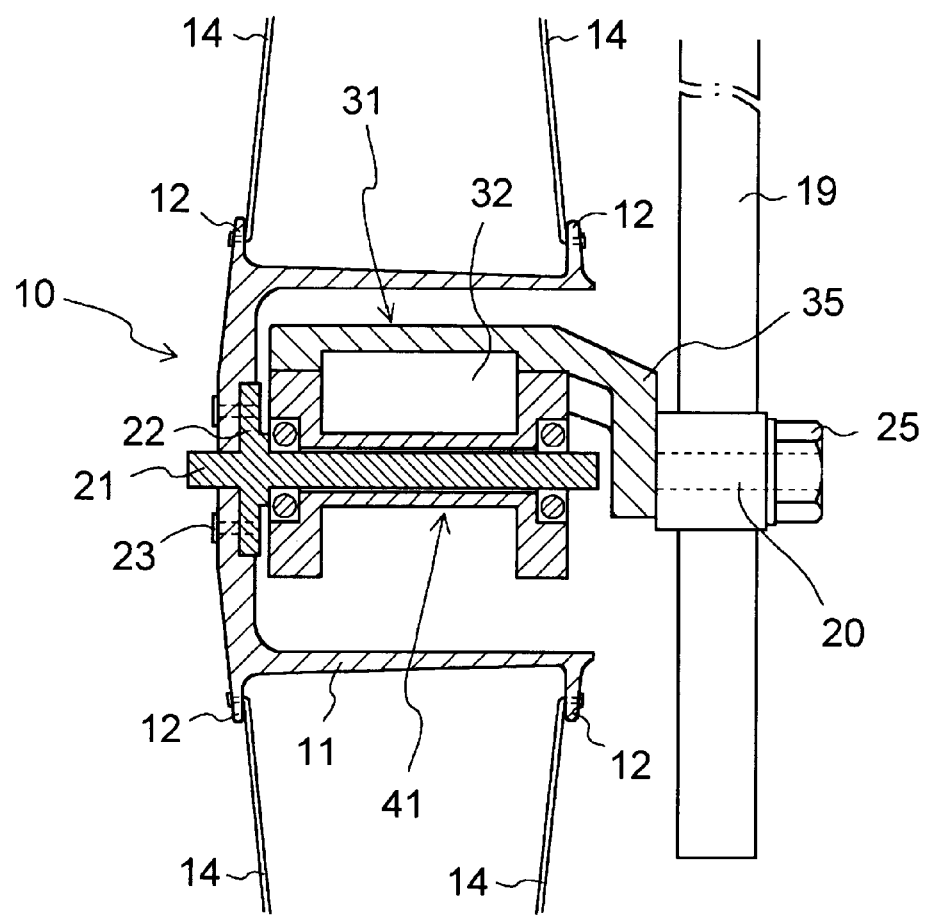
FIG. 3 is a view showing, in a partial section, the state that a wheel provided with the hub for a wheel in FIG. 1 is mounted on a vehicle frame.

As shown in FIG. 2, an exploded view, the axle 21 has an axle base member 22 secured to the center portion of the closed portion of the hub barrel 11 in a cantilever fashion by means of screws 23, and extends toward the open portion. The axle 21 is fitted in and stopped at two left and right bearings 24, 24 of an axle holding member 41 to serve as the rotational means 26. The axle holding member 41 has a buffer member receiver 45 comprising a base plate extending rearward from the left and right bearings 24, 24, and engaging protrusions 42, 42 comprising left and right protrusions extending forward from the left and right bearings 24, 24, the engaging protrusions 42, 42 being provided with link shaft inserting holes 43, 43 in the direction of the axle 21. A buffer member 46 comprising coil springs arranged two in number in the direction of the axle 21 are placed on the buffer member receiver 45. The engaging protrusion 42 is provided with a link shaft inserting hole 43 in the direction of the axle 21.

On the other hand, there is provided a frame shaft holding member 31 formed on the buffer means 40 by a cantilever link mechanism 30 combined with the axle holding member 41 so as to cover it from the top. The frame shaft holding member 31 has a downward engaging convex 32 in the direction of the axle 21 on the forward side thereof, the downward engaging convex 32 being provided with link shaft inserting holes 33. The frame shaft holding member 31 is likewise provided at the rear thereof with a downward buffer member receiver 34 in the direction of the axle 21, and the lower surface of the downward buffer member receiver 34 comes in contact with the upper portion of the buffer member 46 of a coil spring placed on the buffer member receiver 45 of the axle holding member 41.

Further, a downward frame shaft mounting plate 35 is provided on the side to be positioned on the open-portion side of the hub barrel 11, and a frame shaft 20 projecting in the direction opposite the axle 21 is provided at the center lower part of the frame shaft mounting plate 35. The downward engaging convex 32 on the forward side of the frame shaft holding member 31 is fitted between left and right engaging protrusions 42, 42 on the forward side of the axle holding member 41 to register the link shaft inserting hole 33 with the left and right link shaft inserting holes 43, 43, and the link shaft 44 is fitted whereby the frame shaft holding member 31 and the axle holding member 41 are linked in a cantilever fashion rotatably about the link shaft 44.

The hub for a wheel 10 assembled as described above is shown in FIG. 1. And, as shown in FIG. 3, in the hub for a wheel 10 having spokes 14 mounted on the hub flange 12, a vehicle frame 19 of a wheelchair or the like is stopped at the frame shaft 20 extending from the frame shaft mounting plate 35 and fastened by a bolt 25.

Figure 4:
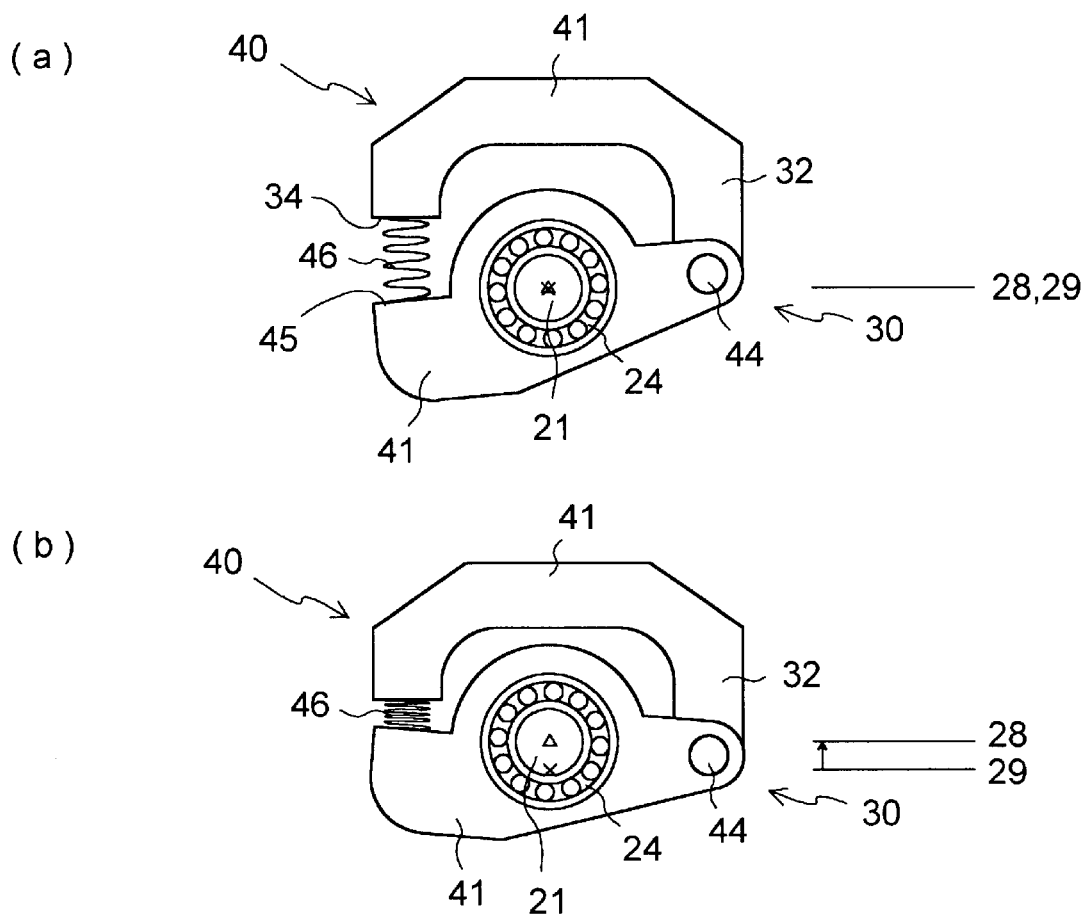
FIGS. 4(a) and 4(b) are respectively schematic side views for explaining the operation of a link mechanism of the hub for a wheel in FIG. 1.

The cantilever link mechanism 30 in the hub for a wheel 10 according to the first embodiment will be explained schematically with reference to FIG. 4. FIG. 4 is a side view of the cantilever link mechanism 30 with the frame shaft mounting plate 35 omitted. In FIG. 4, the center position of the frame shaft 20 is shown by the symbol x, and the center position of the axle 21 is shown by the triangular mark, and an axle position 28 and a frame shaft position 29 are shown by horizontal lines representative of these positions. FIG. 4(a) shows, in case the wheel rolls on the flat road surface, the state that the buffer member 46 of a coil spring is extended springly in the normal state, in which case the axle position 28 and the frame shaft position 29 are in the same height position. FIG. 4(b) shows the case the wheel runs on the projected object to receive the throw-up caused by the shock from the road surface, and the axle position 28 is at a position higher than the frame shaft position 29. That is, the rear end of the axle holding member 41, i.e., the buffer member receiver 45 side is raised upward with the link shaft 44 as a rotational shaft so that the buffer member 46 is pressed and contracted, and as compared with the frame shaft position 29, the axle position 28 is moved to a position higher by the amount shown by the upward arrow. Accordingly, even if the vertical force exerts on the wheel, the vertical force is absorbed by the buffer member 46 of a coil spring of the buffer means 40 due to the shock absorbing action to make the width of the vertical movement small, and vertical swaying of the seat of the vehicle is also made small.

Figure 5:
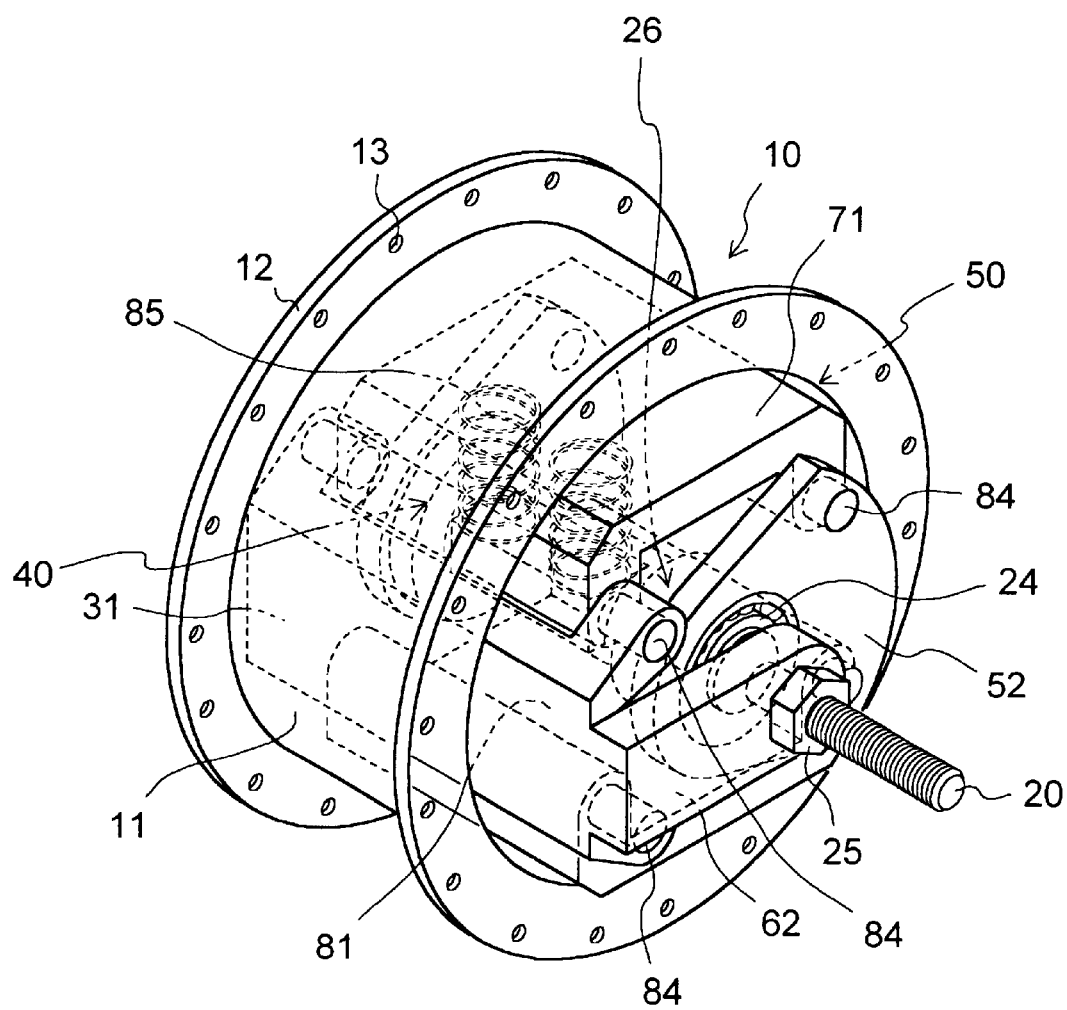
FIG. 5 is a perspective view of a hub for a wheel according to a second embodiment of the present invention.
Figure 6:
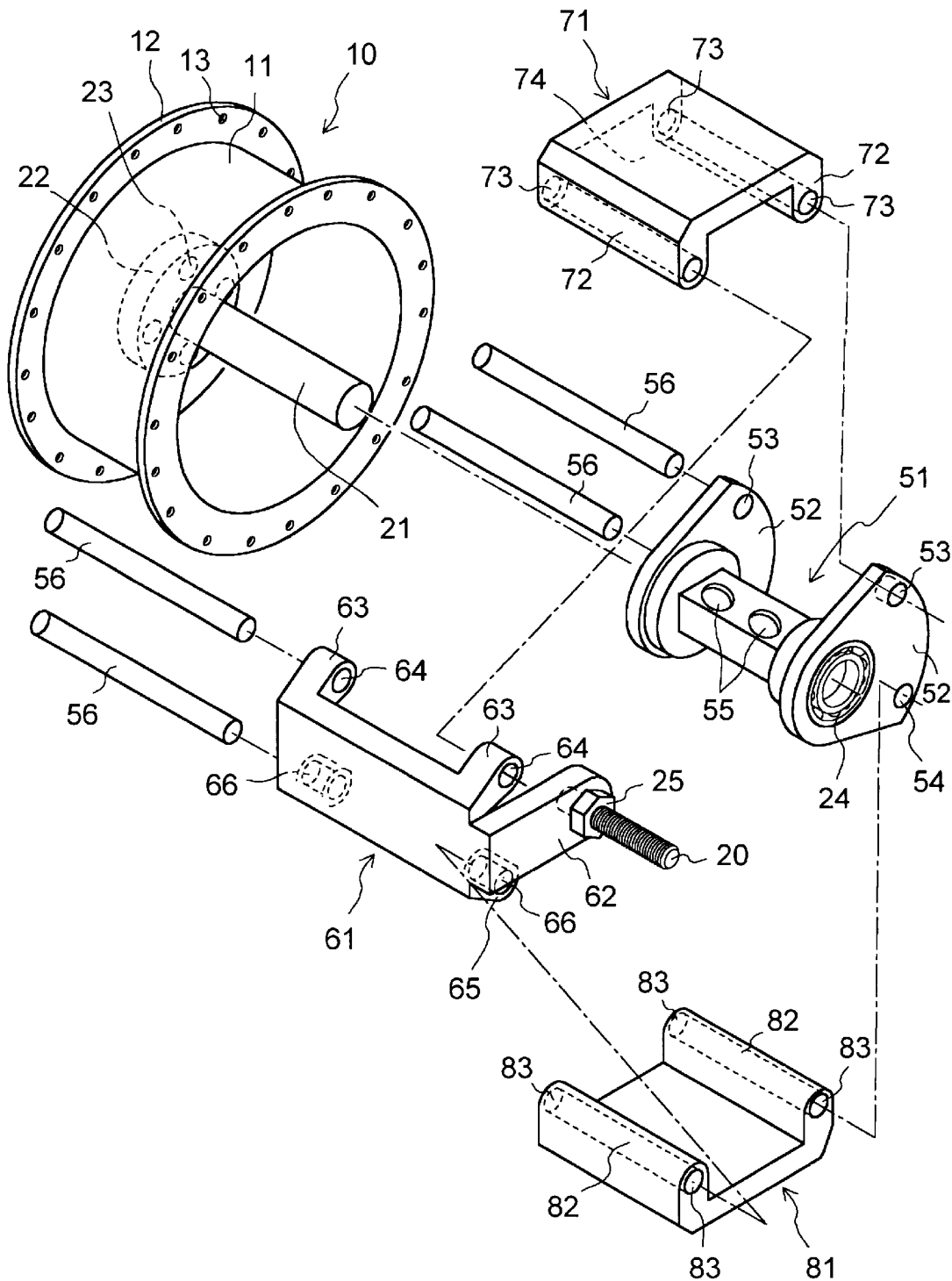
FIG. 6 is an exploded view of the hub for a wheel in FIG. 5.
Figure 7:
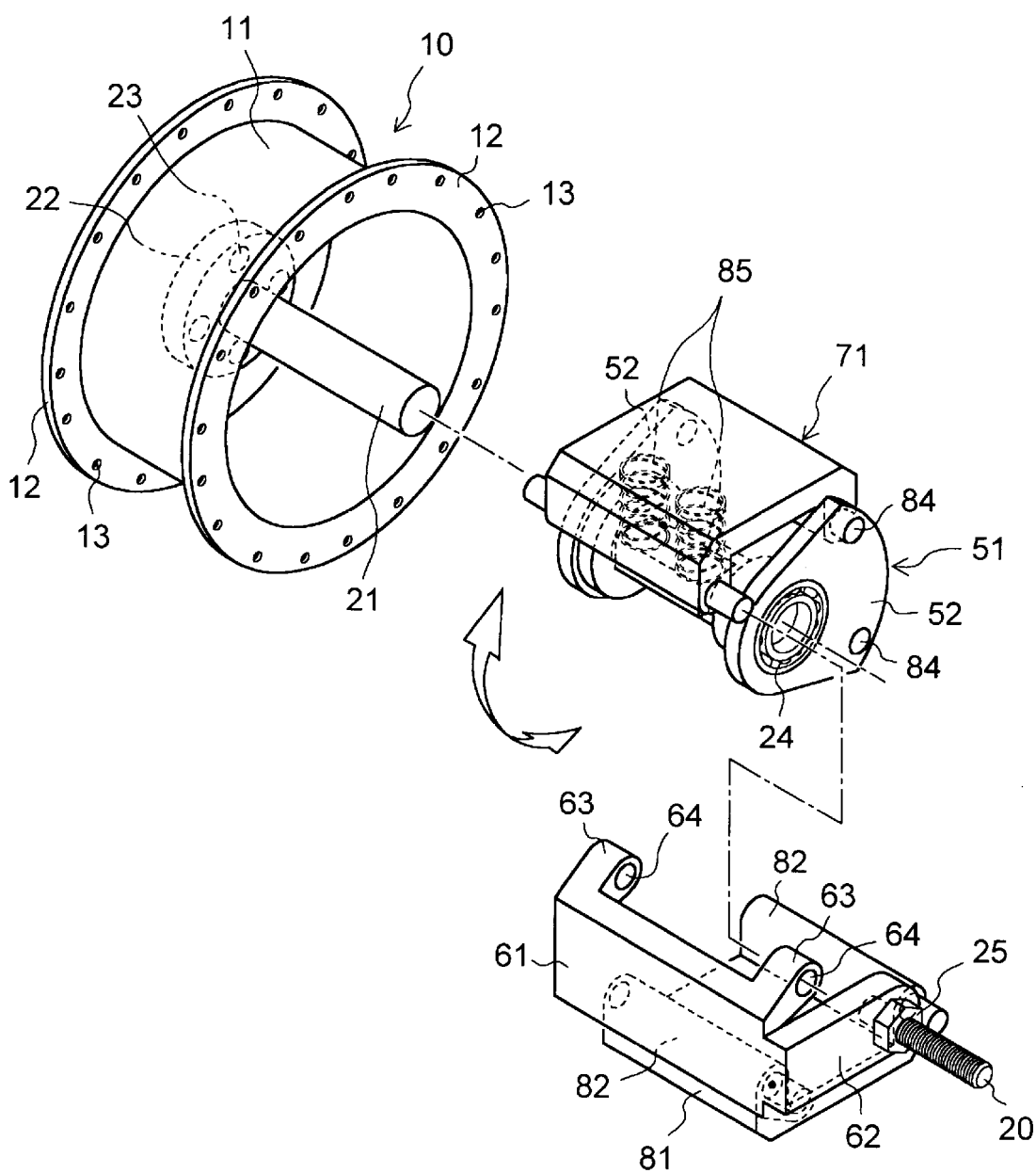
FIG. 7 is a partly assembled exploded view of the hub for a wheel in FIG. 5.

Next, a second embodiment of the hub for a wheel 10 of the present invention is shown in FIGS. 5~7. The hub for a wheel 10 comprises a hub barrel 11 encasing therein a rotational means 26 and a buffer means 40 of an axle 21 disposed in the internal center portion, and making one part a closed portion and the other an open portion, and hub flanges 12 provided radially on opposite ends and having a plurality of spoke holes 13 disposed evenly in the peripheral direction.

As shown in FIG. 6, an exploded view, the axle 21 has an axle base member 22 secured to the center portion of the closed portion of the hub barrel 11 in a cantilever fashion by means of screws 23, and extends toward the open portion. The axle 21 is fitted in and stopped at two left and right bearings 24, 24 of an axle holding member 51 to serve as the rotational means 26. The axle holding member 51 has link member sector engaging plates 52, 52 directed vertical to the axle 21 mounted on the left and right ends thereof, and between these two link member sector engaging plates 52, 52 is formed in the upper surface with a shallow receiving hole of an axle-side buffer member receiver 55, in which the buffer member 46 of a coil spring is fitted. The left and right link member sector engaging plates 52, 52 are provided with upper link member engaging holes 53, 53 in the direction of the axle 21 at the upper portion along the arc-like portion thereof, and are provided with lower link member engaging holes 54, 54 at the lower portion.

A frame shaft holing member 61 is arranged in parallel with an axial direction of the axle holding member 51 and at the rear of the axle holding member 51. The frame shaft holding member 61 has, at its top and bottom of left and right ends, an upper link member engaging element 63 projected obliquely upward on the forward axle holding member 51 side, and a lower link member engaging element 63 projected obliquely downward, the upper link member engaging element 63 having an upper link member engaging hole 64 in parallel with the axle 21, and a lower link member engaging element 65 has a lower link member engaging hole 66 in parallel with the axle 21. Further, there is a frame shaft mounting element 62, extending forward in a direction vertical to the axle 21, in the center of the end on the open portion side of the hub barrel 11 of the frame shaft holding member 61, and in the center of the extreme end of the frame shaft mounting element 62, the frame shaft 20 is mounted by the bolt 25 on the side opposite the axle 21.

There are an upper link member 71 fitted in the left and right link member sector engaging plates 52, 52 of the axle holding member 51 from top and fitted in the left and right upper link member engaging elements 63, 63 of the frame shaft holding member 61 from top, and a lower link member 81 fitted in the left and right link member sector engaging plates 52, 52 of the axle holding member 51 from bottom and fitted in the left and right lower link member engaging elements 65, 65 of the frame shaft holding member 61 from bottom.

There are provided, on the front and rear ends of the upper link member 71, downward engaging convexes 72, 72 in parallel with the axle 21, and in each downward engaging convex 72, an engaging hole 73. The central lower surface of the upper link member 71 serves as an upper buffer member receiver 74, and faces to the axle-side buffer member receiver 55 of the axle holding member 51. In the downward engaging convex 72 of the upper link member 71 fitted in the left and right link member sector engaging plates 52, 52 of the axle holding member 51 from top, the engaging hole 73 is registered with the upper link member engaging hole 53 of the link member sector engaging plate 52 and engaged rotatably by a link shaft 56.

There are provided, at front and rear ends of the lower link member 81, upward engaging convexes 82, 82 in parallel with the axle 21, and in each upward engaging convex 82, an engaging hole 83. In the downward engaging convex 72 of the upper link member 71 fitted, from top, in the upper link member engaging elements 63, 63 on the left and right upper sides of the frame shaft holding member 61, the engaging hole 73 thereof is registered with the upper link member engaging hole 64 of the upper link member engaging element 63 and engaged rotatably by the link shaft 56. On the other hand, in the upward engaging convex 82 of the lower link member 81 fitted, from bottom, in the lower link member engaging elements 65, 65 on the left and right lower sides of the frame shaft holding member 61, the engaging hole 83 thereof is registered with the lower link member engaging hole 66 of the lower link member engaging element 65 and engaged rotatably by the link shaft 56.

The axle holding member 51 engaged rotatably by the link shaft 56, the upper link member 71, the frame shaft holding member 61, and the lower link member 81 form a parallel link mechanism 50. A buffer member 85 of a springy coil spring is disposed between the axle-side buffer member receiver 55 of the axle holding member 51 and the upper buffer member receiver 74 of the upper link member 71.

The hub for a wheel 10 assembled as described above is shown in FIG. 5. And, in the hub for a wheel 10 having the spokes 14 mounted on the hub flange 12, the vehicle frame 19 of a wheelchair or the like is fastened to the frame shaft 20 extending from the link member sector engaging plate 52.

Figure 8:
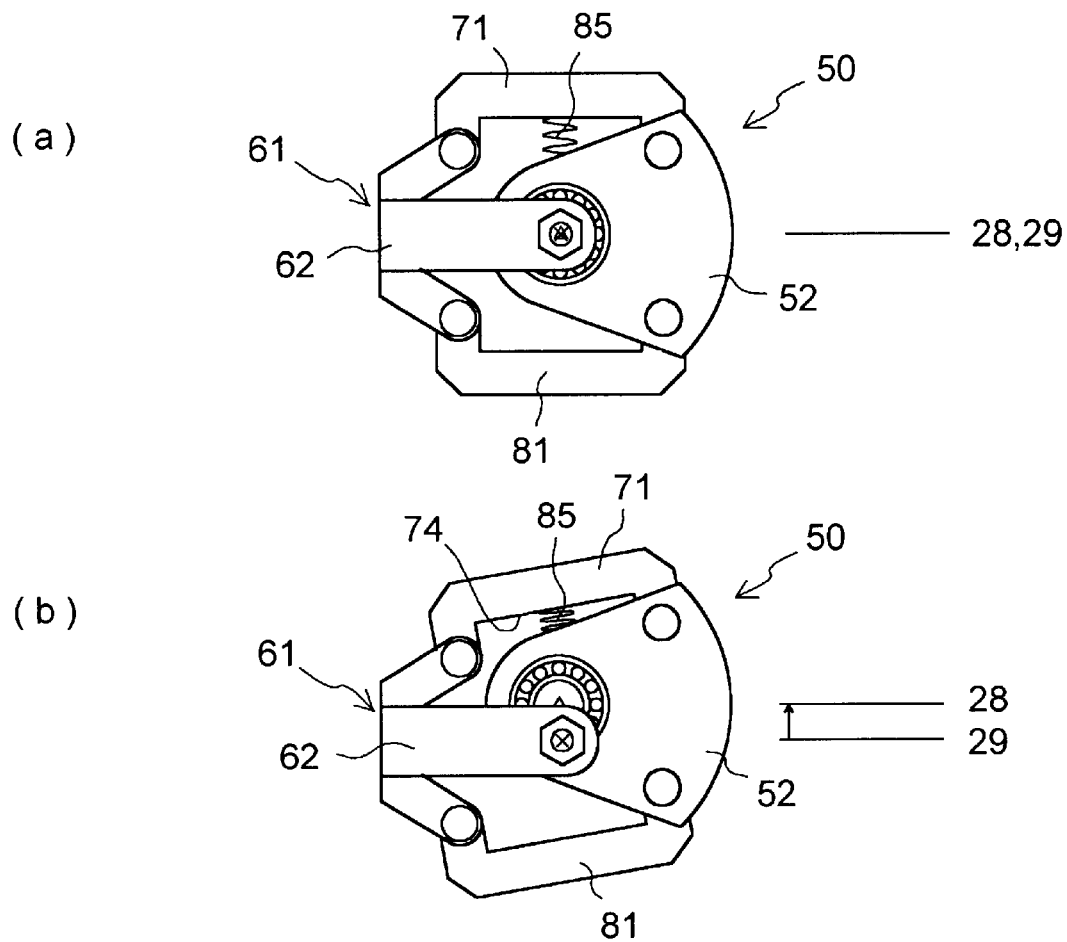
FIGS. 8(a) and 8(b) are respectively schematic side views for explaining the operation of a link mechanism of the hub for a wheel in FIG. 5.

The parallel link mechanism 50 in the hub for a wheel 10 according to the second embodiment will be explained schematically with reference to FIG. 8. FIG. 8 is a side view of the parallel link mechanism 50. In FIG. 8, the center position of the frame shaft 20 of the frame shaft mounting element 62 is shown by the symbol x, and the center position of the axle 21 is shown by the triangular mark, and the axle position 28 and the frame shaft position 29 are shown by horizontal lines representative of these positions. FIG. 8(a) shows, in case the wheel rolls on the flat road surface, the state that the buffer member 85 of a coil spring is extended springly in the normal state, in which case the axle position 28 and the frame shaft position 29 are in the same height position. FIG. 8(b) shows the case the wheel runs on the projected object to receive the throw-up caused by the shock from the road surface, and the axle position 28 is at a position higher than the frame shaft position 29. That is, on the axle-side buffer member receiver 55 side on the axle holding member 51, by the parallel link mechanism 50, the link member sector engaging plate 52 is moved in parallel in the vertical direction, but the frame shaft holding member 61 remains stopped at the original position without rarely moving upward in the vertical direction so that the upper buffer member receiver 74 on the lower surface of the upper link member 71 is substantially at the original position. So, the buffer member 85 of a coil spring is pressed and contracted, and as compared with the frame shaft position 29, the axle position 28 is moved to a position higher by the amount shown by the upward arrow. Accordingly, even if the vertical force exerts on the wheel, the vertical force is absorbed by the buffer member 85 of a coil spring of the buffer means 40 due to the shock absorbing action to make the width of the vertical movement small, and vertical swaying of the seat of the vehicle is also made small.

Figure 9:
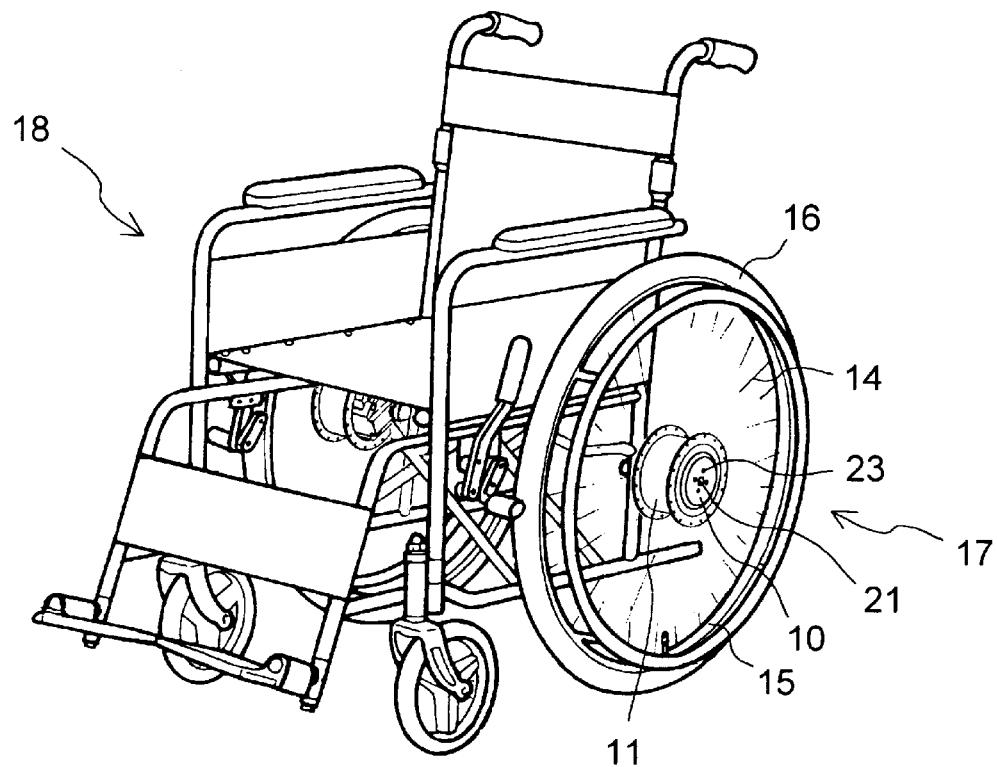
FIG. 9 is a perspective view of a wheelchair having wheels provided with the hub for a wheel according to the present invention.

FIG. 9 shows an embodiment of a wheel 17 using the hub for a wheel 10 of the present invention, which embodiment will be explained by way of a wheelchair 18 of a vehicle 27 equipped with the wheel 17. Since the wheelchair 18 in FIG. 9 is the most general wheelchair, parts names as the normal wheelchair are omitted. In the wheelchair 18, the hub for a wheel 10 having the buffer means 40 internally of the hub barrel 11 in the present invention is used for the wheel 17. For example, as shown in FIG. 1 or FIG. 5, when the hub for a wheel 10 of the present invention is used for the wheel for vehicles such as a bicycle, a wheelchair, or the like, the vehicle having buffer means results easily, which has a construction in which the vehicle frame 19 is supported by the cantilever type frame shaft 20. On the other hand, since the wheelchair has a grip part on the wheel, it originally comprises a cantilever type wheel. Therefore, the wheel 17 using the hub for a wheel 10 of the present invention is the most suitable when it is used for the wheelchair 18.

Further, the hub for a wheel 10 according to a third embodiment, an exploded assembly view of the hub for a wheel 10, an example of the wheel 17 or the castor 117 using the hub for a wheel 10 are shown in FIG. 10, FIG. 11, and FIGS. 12~15, respectively. The hub for a wheel 10 has a rotational means 26 comprising a bearing 124 internally of the hub barrel 11. Further, the buffer means 40 comprising a link mechanism 130 is disposed internally of the rotational means 26.

That is, the hub for a wheel 10 has, in the third embodiment, the rotational means 26 comprising the bearing 124 in the outer circumference of the buffer means 40, and has, in the first and the second embodiments, the bearing 24 of the rotational means 26 internally of the buffer means 40, in which point the third embodiment is different from the first or the second embodiment.

The hub barrel 11 has the hub flange 12 in the outer circumference thereof. In the hub flange 12, in case of the wheel 17, the hub flange 12 is provided with the spoke holes (not shown), similar to the first or the second embodiment, into which the spokes 14 are inserted and can be mounted on a rim 15, or a disk 114 can be disposed and mounted on the rim 15 to provide a disk wheel. In case of a castor 117, the disk 114 portion is made to serve as a small-diameter disk between the hub barrel 11 and the rim 15, and the hub flange 12 and the rim 15 can be formed integrally.

Figure 11:
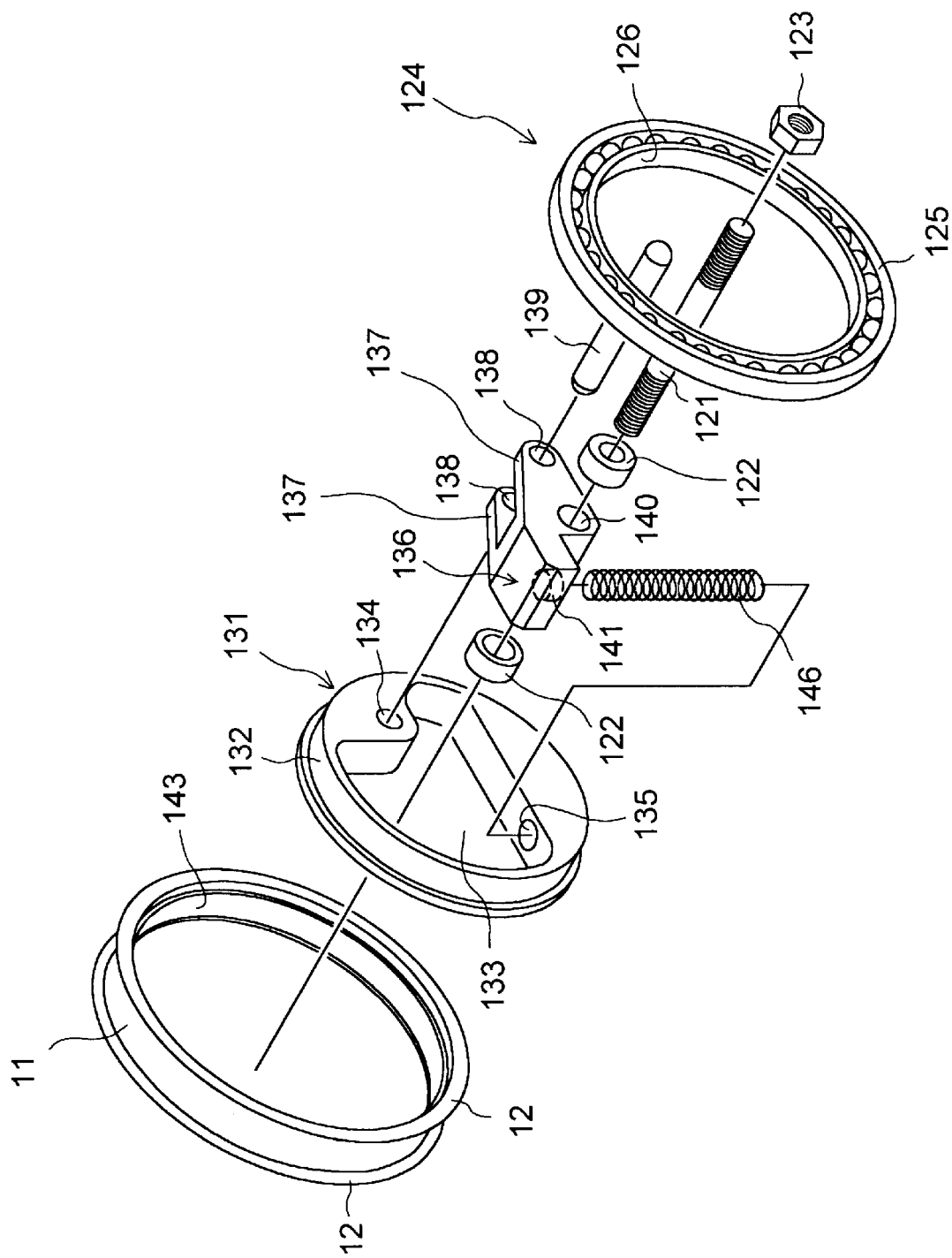
FIG. 11 is an exploded assembly view of the hub for a wheel in FIG. 10.

As can be seen in FIG. 11, the inner circumferential surface of the hub barrel 11 is a bearing outer ring fitting circumferential surface 143. A bearing outer ring 125 is fitted in the bearing outer ring fitting circumferential surface 143, and the bearing 124 as the rotational means 26 is disposed. Further, a disk-like external link 131 of the link mechanism 130 constituting the buffer means 40 is fitted in a bearing inner ring 126 of the bearing 124 by a bearing inner ring fitting circumferential surface 132. The disk-like external link 131 has a link shaft hole 134 at a position deviated from the center, and a sector internal link oscillating space 133 is opened leaving the portion of the link shaft hole 134. On the other hand, an internal link 136 having U-shaped left and right link retaining frames 137, 137 forming the groove width somewhat thicker than the wall-thickness of the external link 131 are disposed in the internal link oscillating space 133 of the external link 131. In this case, Link shaft holes 138, 138 are formed in the ends of the left and right link retaining frames 137, 137 of the internal link 136, the portion of the link shaft hole 134 of the external link 131 is retained by the left and right link retaining frames 137, 137 so that the link shaft holes 138, 138 of the left and right link retaining frames 137, 137 are registered with the link shaft hole 134 of the external link 131, and a link shaft 139 is inserted into the link shaft hole and supported in a cantilever fashion.

Figure 10:
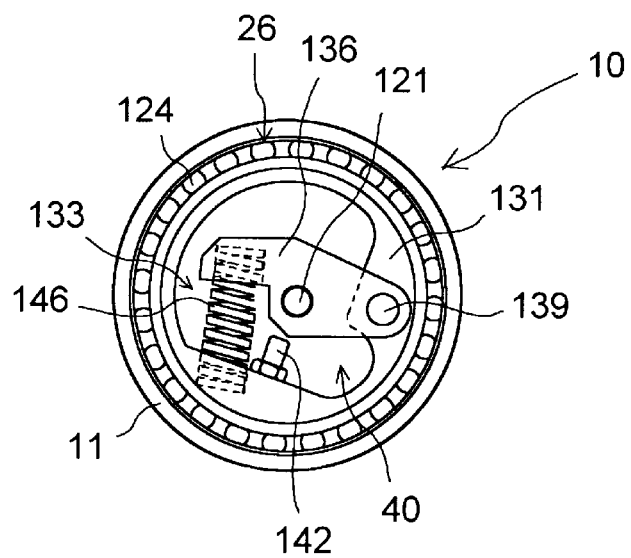
FIG. 10 is a side view of a hub for a wheel according to a third embodiment of the present invention.

A downward buffer member receiving hole 141 receiving a coil spring as a buffer member 146 is formed downward of the extreme end of the internal link 136, while an upward buffer member receiving hole 135 is formed in the portion facing to the buffer member receiving hole 141 of the internal link 136, and the buffer member 146 of a springy coil spring is fitted and disposed between the buffer member receiving hole 135 and the buffer member receiving hole 141. Further, the internal link 136 is formed with an axle hole 140 in parallel with the link shaft 139 this side of the buffer member 146, into which an axle 121 is inserted. Washers 122 are passed through the inserted axle 121 from opposite ends to stop the vehicle frame 19 or a castor frame 118, which are fastened by a bolt 123. Further, as can be seen in FIG. 10, a projected internal link receiving seat 142 is suitably provided this side of a buffer member receiving hole 135 at the lower part of the internal link oscillating space 133 of the external link 131 to control the over-rotation of the internal link 136.

With the constitution of the hub for a wheel 10, the external link 131 and the internal link 136 can be rotated against the springy coil spring of the buffer member 146 independently of the rotation of the rotational means 26, that is, irrespective of the rotation of the wheel.

Figure 12:
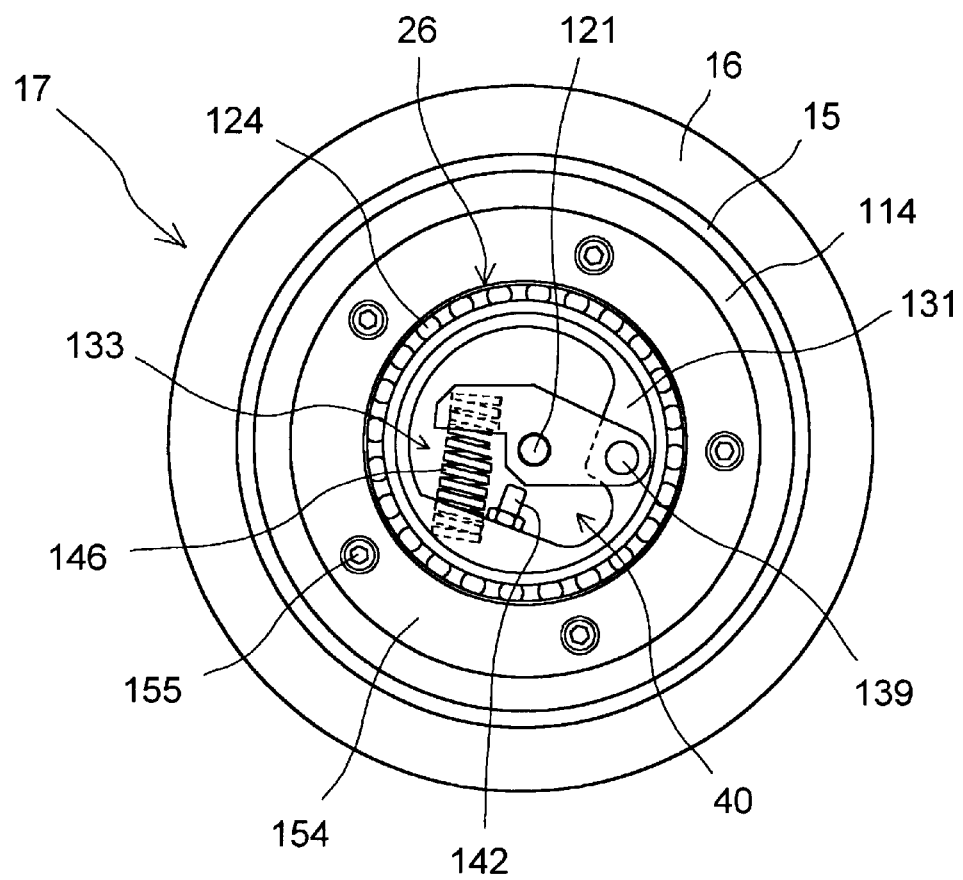
FIG. 12 is a side view of a wheel comprising the hub for a wheel in FIG. 10.

As can be seen in FIG. 12, the hub for a wheel 10 such that a wheel 154 is fastened by a bolt 155 so that the rotational means 26 is not disengaged from the hub barrel 11 is joined to the rim 15 by the disk 114, and a tire 16 is fitted in the rim 15 to provide the wheel 17.

Figure 13:
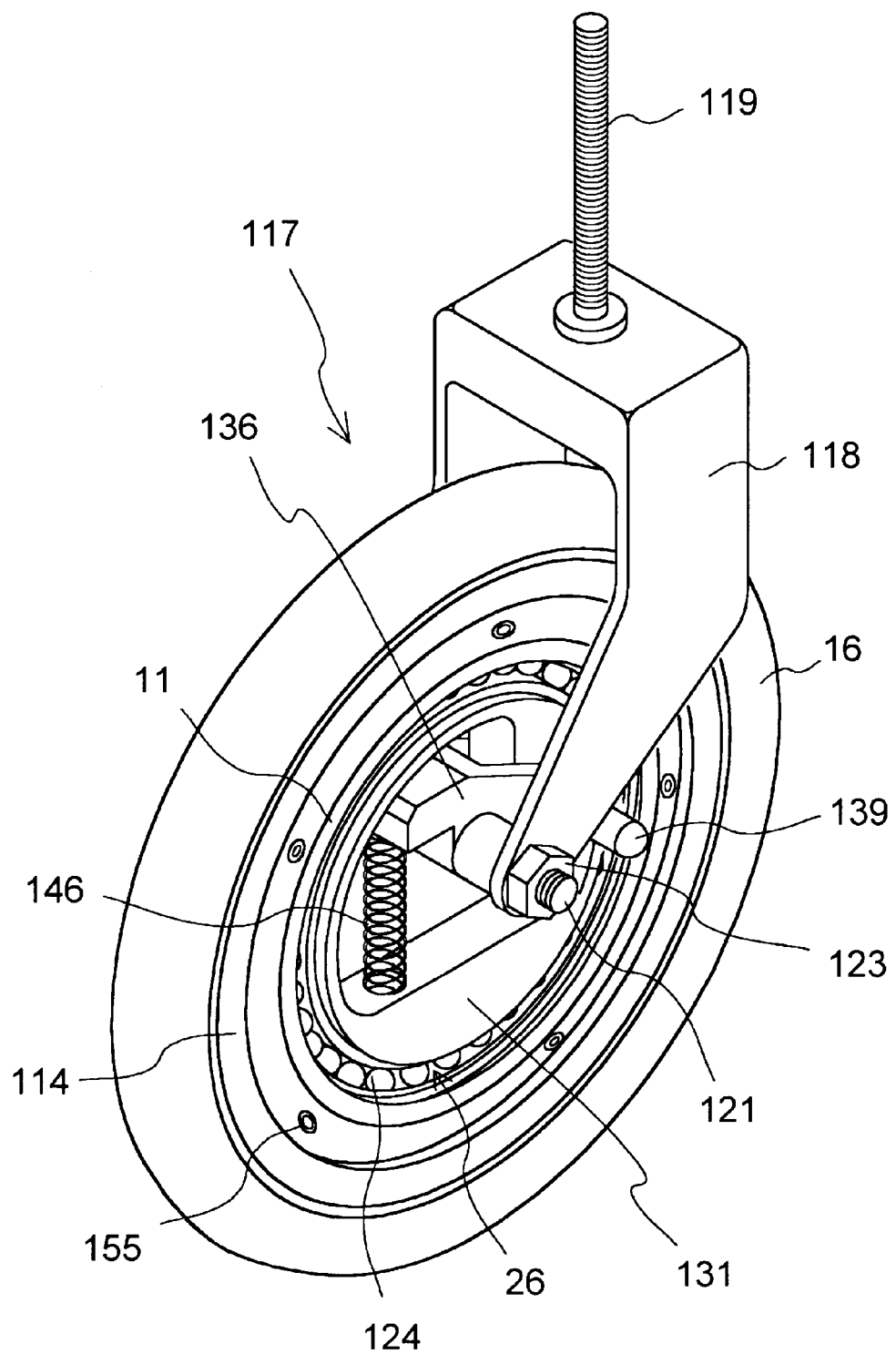
FIG. 13 is a perspective view of the wheel in FIG. 12 in the form of a caster.

FIG. 13 shows that the wheel 17 having the tire 16 fitted therein comprises a castor 117 used for the front wheel of the wheelchair 18, for example. In this case, a castor frame 118 is mounted rotatably on the body of the wheelchair by a castor shaft 119. The axle 121 of the wheel 17 is passed through the caster frame 118 at the lower part of the castor shaft 119 and fastened and mounted by the bolt 123.

Figure 14:
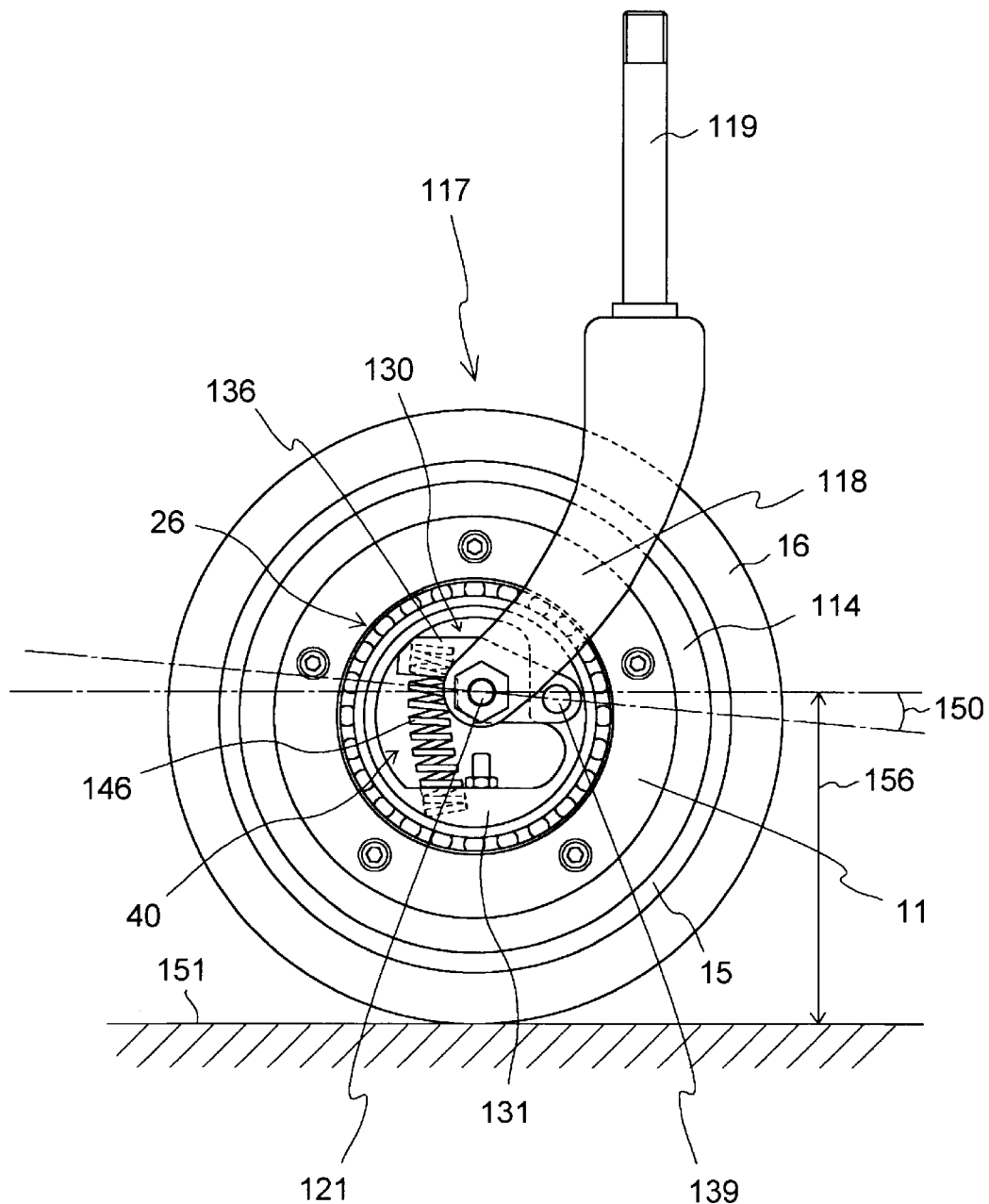
FIG. 14 is a side view of the caster on the smooth road surface.
Figure 15:
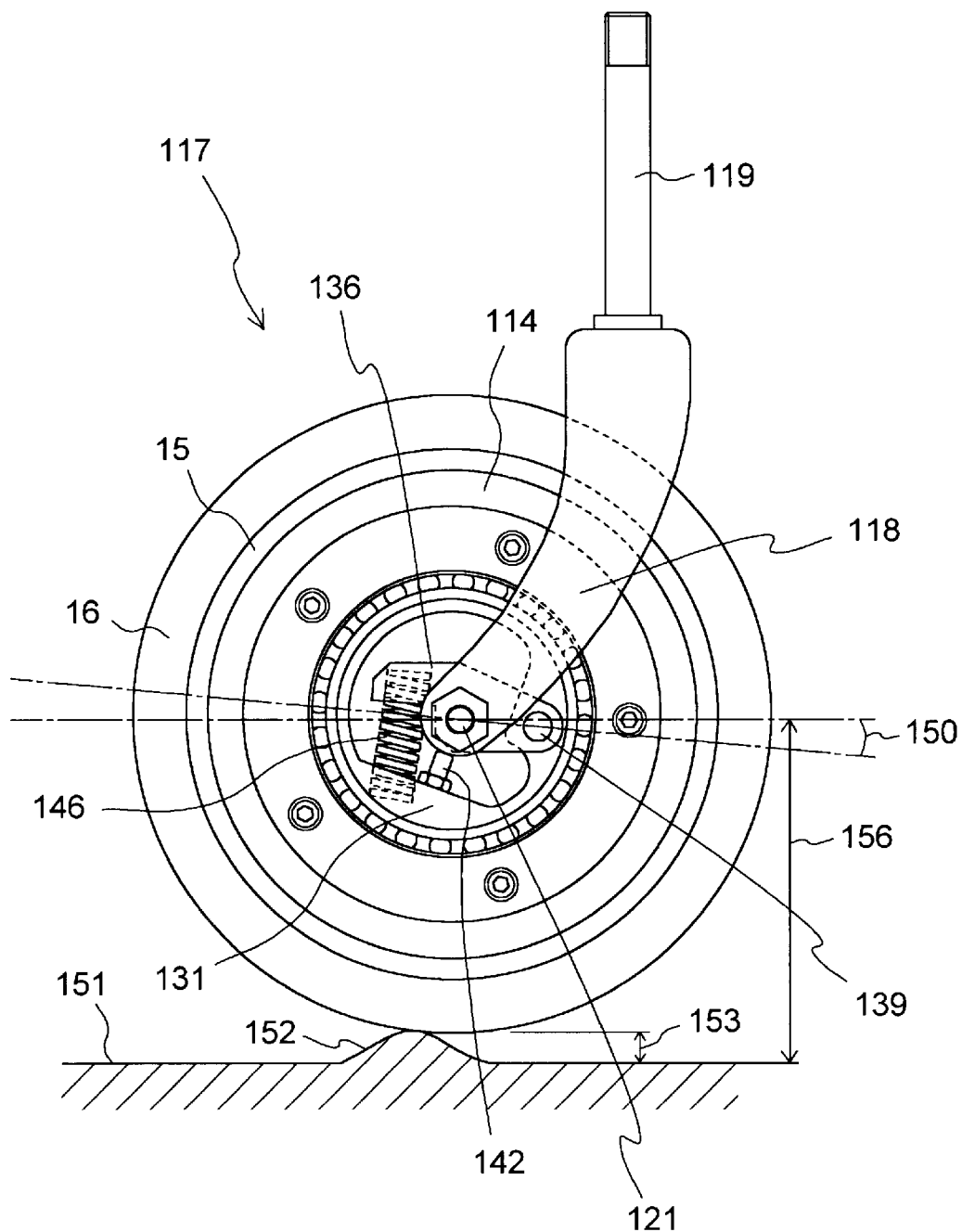
FIG. 15 is a side view of the caster in the state of being run on the difference in level.

Referring to FIGS. 14 and 15, a third embodiment of the wheel 17 using the hub for a wheel 10 of the present invention will be explained by way of the castor 117 equipped with the wheel 17 as a front wheel of the wheelchair 18. In FIGS. 14 and 15, since the wheelchair 18 is a common wheelchair 18, only the castor 117 of the front wheel under the castor shaft 119 is shown, and other parts of the wheelchair 18 are not shown. The castor 117 in FIG. 14 runs on a smooth road surface 151. In this case, the internal link 136 and the external link 131 of the buffer means are biased by the buffer member 146 and most opened. Incidentally, an angle between the extended line of the axle 121 and the link shaft 139 and the horizontal line passing through the axle 121 is an internal link tilting angle 150, and a body height of the wheelchair 18 is determined by an axle height 156 which is a height between the horizontal line passing through the axle 121 and the horizontal smooth road surface 151.

Incidentally, the fact that the wheelchair 18 is stable and is not vibrated vertically means that the internal link tilting angle 150 and the axle height 156 are not varied during the running. Then, as compared with the case where the wheelchair runs on the smooth road surface shown in FIG. 14, the internal link tilting angle 150 and the axle height 156 of the castor 117 when running on a difference in level 152 will be reviewed. When the castor 117 running rightward in the figure, as shown in FIG. 15, the castor 117 is pushed upward by a difference-in-level height 153. However, since a rider is present in the wheelchair 18, the castor is hard to move upward due to the inertia of his (her) weight, and therefore, the external link 131 rotates about the link shaft 139 in the direction of contracting the buffer member 146 of the springy coil spring caused by the aforesaid pushing up force to contract the buffer member 146. Accordingly, the axle height 156 between the smooth road surface 151 and the axle 121 is substantially the same as that shown in FIG. 14, and the internal link tilting angle 150 shown in FIG. 15 is also the same as that shown in FIG. 14. That is, the buffer member 146 is contracted by the rotation of the external link 131, and the shock caused by the difference in level or bump 152 is absorbed, whereby the height of the castor frame 118 was not substantially changed. Accordingly, the wheelchair 18 is able to run in the stabilized manner without varying the height of the seat surface. Further, also in the buffer means 40 in the third embodiment, the link mechanism 30 is provided within the hub barrel 11 and held by the link shaft 139 and the axle 121, because of which the rigidity in the direction of the axle is high, and further, in the third embodiment, the axle 121 is able to support the vehicle frame 19, i.e., the castor frame 118 not by the cantilever mode but both sides thereof, thus providing more stabilized vehicle.

INDUSTRIAL APPLICABILITY

As described above, in the hub for a wheel according to the present invention, the buffer means is placed within the hub barrel to provide arrangements: the buffer means and the rotational means are operated independently whereby the buffer means is not rotated as the wheel rotates, and the rigidity of the wheel in the direction of the axle is enhanced; the buffer means and the rotational means are made to be independent whereby even if a trouble or a defect occurs, replacement of the respective means can be facilitated; the buffer means is provided within the hub for a wheel whereby even if the wheel runs on the difference in level directly, the shock received from the difference in level can be relieved to be comfortable to ride; the buffer means is provided within the hub for a wheel whereby the freedom of designing the vehicle is enhanced; and in the conventional vehicle without buffer means, the wheel of the vehicle is merely replaced by the wheel using the hub for a wheel according to the present invention to enable providing the vehicle having the buffer means easily.

What is claimed is:

1. A hub for a wheel comprising a hub barrel in which rotational means and buffer means are disposed internally, and a frame shaft for supporting a vehicle frame, in which a buffer member of the buffer means enables the movement of an axle only to a vertical direction in the hub barrel.

2. The hub for a wheel according to claim 1, wherein the hub barrel has an axle internally thereof, and rotational means for rotatably supporting the axle, and buffer means independently of rotation of the axle are disposed within the hub barrel.

3. The hub for a wheel according to claim 2, wherein the buffer means has the frame shaft for rotatably engaging the rotational means of the hub barrel by a link mechanism, and engaging and supporting a vehicle frame.

4. The hub for a wheel according to claim 2, wherein the rotational means comprises bearings fitted in left and right of an axle holding member and the axle fitted in the bearings.

5. The hub for a wheel according to claim 1, wherein the hub barrel has the rotational means internally thereof, the buffer means is fitted internally of the rotational means, and the frame shaft for engaging and supporting the vehicle frame is disposed on the buffer means.

6. The hub for a wheel according to claim 5, wherein the rotational means comprises the bearings, the buffer means comprises a link mechanism engaged with the rotational means independently of rotation of the rotational means, and the frame shaft for engaging and supporting the vehicle frame is an axle provided on the link mechanism.

7. A wheel equipped with the hub for a wheel according to any of claims 1 to 5.

* * * * *